US008530552B1

(12) United States Patent
Takamura et al.

(10) Patent No.: US 8,530,552 B1
(45) Date of Patent: Sep. 10, 2013

(54) POLY(PHENYLENE ETHER) COMPOSITION, ARTICLE, AND METHOD

(75) Inventors: Norihiro Takamura, Tochigi (JP); Michael Leslie Todt, Rexford, NY (US); Kirti Sharma, Bergen op Zoom (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/457,616

(22) Filed: Apr. 27, 2012

Related U.S. Application Data

(60) Provisional application No. 61/625,891, filed on Apr. 18, 2012.

(51) Int. Cl.
*C08K 5/523* (2006.01)
(52) U.S. Cl.
USPC ............................ 524/127; 524/140; 524/141
(58) Field of Classification Search
USPC ................... 524/117, 140, 141, 127
See application file for complete search history.

(56) References Cited

U.S. PATENT DOCUMENTS

| | | | |
|---|---|---|---|
| 2,933,480 A | 1/1960 | Gresham et al. | |
| 3,093,621 A | 6/1963 | Gladding | |
| 3,211,709 A | 10/1965 | Adamek et al. | |
| 3,306,874 A | 2/1967 | Hay | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,166,055 A | 8/1979 | Lee, Jr. | |
| 4,433,088 A | 2/1984 | Haaf et al. | |
| 4,584,334 A | 4/1986 | Lee, Jr. et al. | |
| 4,966,814 A | 10/1990 | Ohzeki | |
| 5,145,877 A | 9/1992 | Bopp et al. | |
| 5,264,487 A | 11/1993 | Scobbo, Jr. et al. | |
| 5,420,200 A * | 5/1995 | Koning et al. | 525/68 |
| 5,561,186 A | 10/1996 | Nagaoka et al. | |
| 5,635,556 A | 6/1997 | Rosenthal | |
| 5,772,041 A | 6/1998 | Kertscher et al. | |
| 5,894,996 A | 4/1999 | Williams | |
| 5,951,940 A | 9/1999 | Nosker et al. | |
| 5,998,503 A | 12/1999 | Jacobson et al. | |
| 6,025,419 A | 2/2000 | Kasowski et al. | |
| 6,054,516 A * | 4/2000 | Yoshida et al. | 524/147 |
| 6,262,166 B1 * | 7/2001 | Yoshida et al. | 524/508 |
| 6,274,637 B1 | 8/2001 | Schallenberg | |
| 6,426,474 B1 | 7/2002 | Maehata et al. | |
| 6,469,098 B1 | 10/2002 | Okada et al. | |
| 6,522,149 B2 | 2/2003 | Yokoyama et al. | |
| 6,588,597 B2 | 7/2003 | Arakane et al. | |
| 6,737,459 B2 | 5/2004 | Ebisawa et al. | |
| 7,037,951 B2 | 5/2006 | Inagaki | |
| 7,790,791 B2 | 9/2010 | Culligan | |
| 7,884,140 B2 | 2/2011 | Riise et al. | |
| 7,964,675 B2 | 6/2011 | Ko et al. | |
| 8,017,716 B2 | 9/2011 | Carrillo et al. | |
| 8,025,158 B2 | 9/2011 | Delsman et al. | |
| 8,057,873 B2 | 11/2011 | Levasalmi | |
| 2005/0148708 A1 * | 7/2005 | Ahn et al. | 524/115 |
| 2005/0228131 A1 * | 10/2005 | Jang et al. | 525/68 |
| 2012/0298548 A1 | 11/2012 | Riding | |

FOREIGN PATENT DOCUMENTS

| | | |
|---|---|---|
| EP | 442102 A1 | 8/1991 |
| JP | 09-087511 | 3/1997 |
| JP | 2000159900 | 6/2000 |
| JP | 2002292628 A | 10/2002 |
| WO | 9222608 A1 | 12/1992 |
| WO | 9808898 A1 | 3/1998 |
| WO | 03028998 A1 | 4/2003 |
| WO | 03087215 A1 | 10/2003 |
| WO | 2009104107 A1 | 8/2009 |

OTHER PUBLICATIONS

JP2002088212 A, Mar. 27, 2002, Abstract, 1 page.
JP2002198116 A, Jul. 12, 2002, Abstract, 2 pages.
Liang et al., "The Effect of Residual Impurities on the Rheological and Mechanical Properties of Engineering Polymers Separated From Mixed Plastics", SPE 59th ANTEC held May 6-10, 2001; 5 pages.
Internatioanl Search Report for International Application No. PCT/US2005/011788, International Filing Date Jun. 4, 2005, Date of Mailing Jan. 7, 2005, 6 pages.
Written Opinion for International Application No. PCT/US2005011788, International Filing Date Jun. 4, 2005, date of mailing Jan. 7, 2005, 6 pages.
EMPRA 641F INEOS Styrenics Product Data Sheet Downloaded from http://www.ineosstyrenics.com/cfapps/prodfinder/documents/datasheets/EU_HIPS_Empera641F_datasheet_EN.pdf on Sep. 19, 2011, 2 pages.
Polystyrene Impact 3450 Total Petrochemicals Technical Data Sheet, Downloaded from http://www.totalpetrochemicals.com/EN/ProductCatalog/Catalog/Pages/3450-EU.aspx on Sep. 19, 2011, 1 page.
U.S. Appl. No. 13/229,066, filed with the USPTO Aug. 18, 2011.
U.S. Appl. No. 13/673,160, filed with the USPTO Nov. 9, 2012.
JP2000129114 A, May 9, 2000, Abstract Only, 1 page.
JP2000159900 A, Jun. 13, 2000, Abstract Only, 1 page.
JP2001079842 A, Mar. 27, 2001, Abstract Only, 1 page.
JP2002212414 A, Jul. 31, 2002, Abstract Only, 1 page.
JP2003103521 A, Apr. 9, 2003, Abstract Only, 1 page.
JP2003320532 A, Nov. 11, 2003, Abstract Only, 1 page.
JP2004002614 A, Jan. 8, 2004, Abstract Only, 1 page.
JP2004314420 A, Nov. 11, 2004, Abstract Only, 1 page.

(Continued)

*Primary Examiner* — Peter Szekelyy
(74) *Attorney, Agent, or Firm* — Cantor Colburn LLP

(57) ABSTRACT

A composition includes specific amounts of poly(phenylene ether), polymerized styrene residue, and polymerized acrylonitrile residue. The composition can be prepared using a recycled homopolystyrene that includes an acrylonitrile copolymer as an impurity. The composition largely preserves the desirable properties of a corresponding composition prepared from virgin resins without requiring chemical compatibilization of the poly(phenylene ether) and the acrylonitrile copolymer.

13 Claims, No Drawings

(56) References Cited

OTHER PUBLICATIONS

JP2005112930 A, Apr. 28, 2005, Abstract Only, 1page.
JP2005154584 A, Jun. 16, 2005, Abstract Only, 1 page.
JP2005179476 A, Jul. 7, 2005, Abstract Only, 1 page.
JP2006137808 A, Jun. 1, 2006, Abstract Only, 1 page.
JP2006274032 A, Oct. 12, 2006, Abstract Only, 1 page.
JP2006297620 A, Nov. 2, 2006, Abstract Only, 1 page.
JP2009256691 A, Nov. 5, 2009, Abstract Only, 1 page.
JP2010083977 A, Apr. 15, 2010, Abstract Only, 1 page.
JP2010105244 A, May 13, 2010, Abstract Only, 1 page.
JP2011063689 A, Mar. 31, 2011, Abstract Only, 1 page.
International Search Report for International Application No. PCT/US2012/048914, International Application Filing Date Jul. 31, 2012, Date of Mailing Feb. 26, 2013, 4 pages.
Written Opinion for International Application No. PCT/US2012/048914, International Application Filing Date Jul. 31, 2012, Date of Mailing Feb. 26, 2013, 4 pages.
International Search Report for International Application No. PCT/US2013/035733, International Application Filing Date Apr. 9, 2013, Date of Mailing Jul. 15, 2013, 6 pages.
Written Opinion for International Application No. PCT/US2013/035733, International Application Filing Date Apr. 9, 2013, Date of Mailing Jul. 15, 2013, 6 pages.

* cited by examiner

POLY(PHENYLENE ETHER) COMPOSITION, ARTICLE, AND METHOD

CROSS REFERENCE TO RELATED APPLICATION

This application claims the benefit of U.S. Provisional Application Ser. No. 61/625,891 filed Apr. 18, 2012, which is hereby incorporated by reference in its entirety.

BACKGROUND OF THE INVENTION

Poly(phenylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(phenylene ether)s with various other plastics in order to meet the requirements of a wide variety of consumer products, for example, plumbing fixtures, electrical boxes, automotive parts, and insulation for wire and cable.

Blends of poly(phenylene ether)s and polystyrenes are commercially available and used for injection molding articles such as housings for appliances and consumer electronics. To reduce waste and conserve energy, it would be desirable to prepare blends of poly(phenylene ether)s and polystyrenes using recycled polystyrene materials. U.S. Pat. No. 5,264,487 to Scobbo et al. describes a plastic composition that includes a poly(phenylene ether) and a polystyrene, and further includes an acrylonitrile-butadiene-styrene copolymer and a copolymer of an olefin such as ethylene and an epoxy compound such as glycidyl methacrylate. The poly (phenylene ether), polystyrene, and acrylonitrile-butadiene-styrene copolymer can be provided in the form of a mixed recycling stream. However, the poor compatibility of the acrylonitrile-butadiene-styrene copolymer with the poly (phenylene ether) and polystyrene requires the use of the olefin-epoxy copolymer as a compatibilizer. It would be desirable to avoid the complexity and expense of using such a compatibilizer.

U.S. Pat. No. 7,964,675 to Ko et al. describes a plastic composition that includes a recycled poly(phenylene ether) and another recycled plastic that can be, among others, acrylonitrile-butadiene-styrene copolymer. The composition minimizes or eliminates any recycled plastic that can decompose and form volatile components during formation of the plastic composition. The Ko composition maximizes use of recycled feedstocks, however, its impact strength is not sufficient for some injection molding applications.

There remains a need for blends of poly(phenylene ether)s and polystyrenes that utilize a recycled plastic feedstock while largely preserving the impact strength exhibited by blends prepared from virgin resins.

BRIEF SUMMARY OF EMBODIMENTS OF THE INVENTION

One embodiment is a composition comprising: greater than 40 to about 94.8 weight percent of a poly(phenylene ether); about 5 to about 59.8 weight percent of polymerized styrene residue; and about 0.2 to less than 1.5 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified.

Another embodiment is a composition comprising: about 60 to about 80 weight percent of a poly(2,6-dimethyl-1,4-phenylene ether) having an intrinsic viscosity of about 0.35 to about 0.6 deciliter per gram measured at 25° C. in chloroform; about 5 to about 15 weight percent of polymerized styrene residue; about 0.4 to about 2 weight percent of a polymerized 1-butene residue; about 10 to about 20 weight percent of a flame retardant comprising an organophosphate ester; and about 0.2 to about 1.2 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified.

Another embodiment is an article comprising the composition.

Another embodiment is a method of forming a composition, comprising: melt blending components comprising greater than 40 to about 94.8 weight percent of a poly(phenylene ether), about 5 to about 59.8 weight percent of a homopolystyrene, and an amount of an acrylonitrile homopolymer and/or copolymer sufficient to provide about 0.2 to less than 1.5 weight percent of polymerized acrylonitrile residue to form a composition; wherein the composition comprises less than or equal to 120 parts per million by weight of secondary aliphatic hydroxyl groups; and wherein all amounts are based on the total weight of the composition, unless a different weight basis is specified.

These and other embodiments are described in detail below.

DETAILED DESCRIPTION OF THE INVENTION

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

In an exploration of blends of poly(phenylene ether) and homopolystyrene utilizing recycled homopolystyrene, the present inventors have determined that recycled homopolystyrene often includes significant amounts of acrylonitrile copolymer impurities. At high levels, these impurities can significantly compromise the impact strength of the polymer blend. By placing a specific limit on the amount of polymerized acrylonitrile residue associated with acrylonitrile copolymer impurities, the present inventors have determined that it is possible to provide a blend of poly(phenylene ether) and homopolystyrene that utilizes recycled homopolystyrene while largely preserving the desirable properties of a corresponding blend prepared from virgin resins. The composition does not require a compatibilizing agent, such as the compatibilizing olefin-epoxy copolymer of U.S. Pat. No. 5,264, 487 to Scobbo et al. Thus, one embodiment is a composition comprising: greater than 40 to about 94.8 weight percent of a poly(phenylene ether); about 5 to about 59.8 weight percent of polymerized styrene residue; and about 0.2 to less than 1.5 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified.

The composition comprises a poly(phenylene ether). Suitable poly(phenylene ether)s include those comprising repeating structural units having the formula

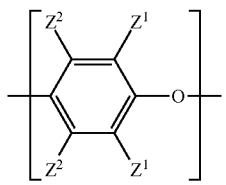

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a 3,5-dimethyl-1,4-phenyl group with the di-n-butylamine component of an oxidative polymerization catalyst.

In some embodiments, the poly(phenylene ether) has an intrinsic viscosity of about 0.2 to about 1 deciliter per gram measured at 25° C. in chloroform. Within this range, the poly(phenylene ether) intrinsic viscosity can be about 0.25 to about 0.8 deciliter per gram, more specifically about 0.25 to about 0.7 deciliter per gram, even more specifically about 0.3 to about 0.65 deciliter per gram, yet more specifically about 0.35 to about 0.6 deciliter per gram.

In some embodiments, the poly(phenylene ether) used to prepare the composition consists of a "virgin" poly(phenylene ether), which means that it is an as-produced poly(phenylene ether), as contrasted with a recycled poly(phenylene ether) or a poly(phenylene ether) that has undergone significant thermal processing. Compared to a recycled poly(phenylene ether), a virgin poly(phenylene ether) will generally possess lower concentrations of poly(phenylene ether) rearrangement products, such as bridging products and branching products. For example, a virgin poly(2,6-dimethyl-1,4-phenylene ether) will generally possess less than 100 parts per million by weight of the bridging fragment below:

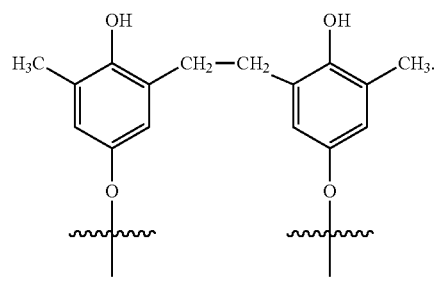 [SMILES: *Oc1cc(C)c(O)c(CCc2cc(O*)cc(C)c2O)c1]

As another example, a virgin poly(2,6-dimethyl-1,4-phenylene ether) will generally possess less than 100 parts per million by weight of the branching fragment below:

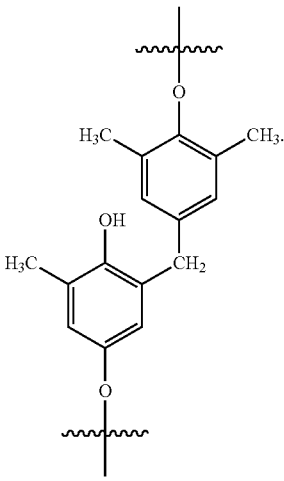 [SMILES: *Oc1cc(C)c(O)c(Cc2cc(C)c(O*)c(C)c2)c1]

These fragments can be identified and quantified by carbon nuclear magnetic resonance spectroscopy.

In some embodiments, the poly(phenylene ether) is essentially free of incorporated diphenoquinone residues. In this context, "essentially free" means that the less than 1 weight percent of poly(phenylene ether) molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) comprising terminal or internal diphenoquinone residues). For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of incorporated diphenoquinone. However, such reequilibration reduces the molecular weight of the poly(phenylene ether). Accordingly, when a higher molecular weight poly(phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution comprising poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with about 1 to about 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Pat. No. 8,025,158 B2 to Delsman et al. In an alternative approach utilizing the temperature-dependent solubility of diphenoquinone in toluene, a toluene solution containing diphenoquinone and poly(phenylene ether) can be adjusted to a temperature of about 25° C., at which diphenoquinone is poorly soluble but the poly(phenylene ether) is soluble, and the insoluble diphenoquinone can be removed by solid-liquid separation (e.g., filtration).

In some embodiments, the poly(phenylene ether) comprises 2,6-dimethyl-1,4-phenylene ether units, 2,3,6-trimethyl-1,4-phenylene ether units, or a combination thereof. In some embodiments, the poly(phenylene ether) is a poly(2,6-dimethyl-1,4-phenylene ether). In some embodiments, the poly(phenylene ether) comprises a poly(2,6-dimethyl-1,4-phenylene ether) having an intrinsic viscosity of about 0.25 to about 0.8 deciliter per gram, more specifically about 0.25 to about 0.7 deciliter per gram, even more specifically about 0.3 to about 0.65 deciliter per gram, yet more specifically about 0.35 to about 0.6 deciliter per gram, measured at 25° C. in chloroform.

The poly(phenylene ether) can comprise molecules having aminoalkyl-containing end group(s), typically located in a position ortho to the hydroxyl group. The poly(phenylene ether) can be in the form of a homopolymer, a copolymer, a graft copolymer, an ionomer, or a block copolymer, as well as combinations comprising at least one of the foregoing.

The composition comprises the poly(phenylene ether) in an amount of greater than 40 to about 94.8 weight percent, based on the total weight of the composition. Within this range, the poly(phenylene ether) amount can be at least 41 weight percent, at least 43 weight percent, at least 45 weight percent, or at least about 50 weight percent. Also within this range, the poly(phenylene ether) amount can be up to about 90 weight percent, up to about 85 weight percent, up to about 80 weight percent, or up to about 75 weight percent.

In addition to the poly(phenylene ether), the composition comprises polymerized styrene residue. When preparing the composition, the polymerized styrene residue can be provided in the form of a homopolystyrene. As used herein, the term homopolystyrene refers to a homopolymer of styrene. Thus, the residue of any monomer other than styrene is excluded from the homopolystyrene. The homopolystyrene can be atactic, syndiotactic, or isotactic. In some embodiments, the homopolystyrene consists of atactic homopolystyrene. In some embodiments, the homopolystyrene has a melt volume flow rate of 1.5 to 5 cubic centimeters per 10 minutes, measured at 200° C. and 5 kilogram load according to ISO 1133.

The composition comprises the polymerized styrene residue in an amount of about 5 to about 59.8 weight percent, based on the total weight of the composition. Within this range, the amount of polymerized styrene residue can be about 7 to about 50 weight percent, specifically about 9 to about 40 weight percent, more specifically about 11 to about 30 weight percent, yet more specifically about 11 to about 20 weight percent. The amount of polymerized styrene residue can be calculated based on the components used to form the composition. Alternatively, the amount of polymerized styrene residue can be determined by carbon nuclear magnetic resonance spectroscopy.

In addition to the poly(phenylene ether) and the polymerized styrene residue, the composition comprises polymerized acrylonitrile residue. The amount of polymerized acrylonitrile residue can be about 0.2 to less than 1.5 weight percent, based on the total weight of the composition. Within this range, the amount of polymerized acrylonitrile residue can be about 0.4 to about 1.4 weight percent, specifically about 0.6 to about 1.3 weight percent, even more specifically about 0.6 to about 1.2 weight percent, yet more specifically about 0.6 to about 1 weight percent. The amount of polymerized acrylonitrile residue can be determined by carbon nuclear magnetic resonance spectroscopy, or by gradient polymer elution chromatography.

In some embodiments, at least a portion of the polymerized styrene residue and at least a portion of the polymerized acrylonitrile residue are provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof. In some embodiments, substantially all of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof. Such post-consumer recycled general purpose polystyrenes (PCR GPPS) materials are commercially available as, for example, GP-RN from Evergreen Co., Ltd. Another post-consumer recycled general purpose polystyrene is obtained from recycled refrigerate trays and is available from Hyper Cycle Systems Corporation. When a homopolystyrene is provided as a post-consumer recycled material, the amount of homopolystyrene in the composition will account for the purity of the recycled material. For example, if a composition incorporates 60 weight percent of a post-consumer recycled rubber-modified polystyrene that is 90% pure, then the composition contains 54% homopolystyrene.

The composition does not require the compatibilizing olefin-epoxy copolymer of U.S. Pat. No. 5,264,487 to Scobbo et al. As a result, the composition need not comprise the secondary aliphatic hydroxyl groups that are formed on reaction of the epoxy groups of the Scobbo compatibilizing copolymer. Specifically, in some embodiments the composition comprises less than or equal to 120 parts per million by weight, specifically less than or equal to 100 parts per million by weight, of secondary aliphatic hydroxyl groups. In some embodiments, the composition excludes secondary aliphatic hydroxyl groups. The amount of secondary aliphatic hydroxyl groups residue can be determined by carbon nuclear magnetic resonance spectroscopy.

In some embodiments, the composition comprises less than or equal to 0.7 weight percent of polymerized butadiene residue, based on the total weight of the composition. The term "polymerized butadiene residue" will be understood to include the residue of butadiene 1,2-addition having the structure

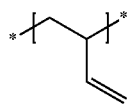

and the residue of butadiene 1,4-addition having the structure

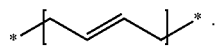

In some embodiments the weight percent of polymerized butadiene residue is less than or equal to 0.6 weight percent, specifically less than or equal to 0.5 weight percent, more specifically less than or equal to 0.3 weight percent, even more specifically less than or equal to 0.1 weight percent. In some embodiments, the composition excludes polymerized butadiene residue. The amount of polymerized butadiene residue can be determined by carbon nuclear magnetic resonance spectroscopy.

In some embodiments, the composition further comprises about 0.5 to about 18 weight percent of a polymerized butadiene residue, based on the total weight of the composition. Within this range, the polymerized butadiene residue amount can be about 1 to about 14 weight percent, specifically about 2 to about 9 weight percent, more specifically about 3 to about 6 weight percent. The polymerized butadiene residue can be provided in various forms, including rubber-modified polystyrene, block copolymers of styrene and butadiene, and combinations thereof.

In some embodiments, the composition further comprises about 0.1 to about 5 weight percent of a polymerized 1-butene residue, based on the total weight of the composition. Within this range, the amount of polymerized 1-butene residue can be about 0.2 to about 4 weight percent, specifically about 0.5 to about 3 weight percent, more specifically about 0.4 to about 2 weight percent. As used herein, the term "polymerized 1-butene residue" refers to residue having the structure

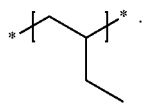

The polymerized 1-butene residue can be provided to the composition in the form of polymers including poly(1-butene), poly(ethylene-co-1-butene), polystyrene-poly(ethylene-co-1-butene) diblock copolymers (SEB), polystyrene-poly(ethylene-co-1-butene)-polystyrene triblock copolymers (SEBS), and mixtures thereof. In some embodiments, the polymerized 1-butene residue is provided to the composition in the form of a polystyrene-poly(ethylene-co-1-butene)-polystyrene triblock copolymer (SEBS). The amount of the polymer comprising polymerized 1-butene residue can be about 1 to about 20 weight percent, specifically about 2 to about 15 weight percent, more specifically about 3 to about 10 weight percent, even more specifically about 4 to about 8 weight percent, all based on the total weight of the composition.

In some embodiments, the composition further comprises a flame retardant. A flame retardant is a chemical compound or mixture of chemical compounds capable of improving the flame retardancy of the thermoplastic composition. Suitable flame retardants include organophosphate esters, metal dialkylphosphinates, nitrogen-containing flame retardants, metal hydroxides, and mixtures thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups; bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris (isopropylphenyl) phosphates (for example, CAS Reg. No. 68937-41-7), and mixtures thereof.

In some embodiments the organophosphate ester comprises a bis-aryl phosphate having the formula

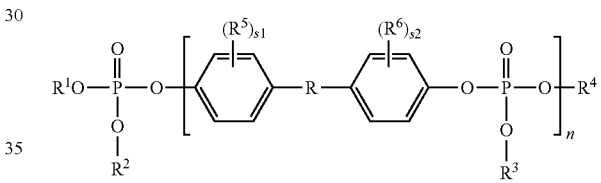

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently at each occurrence an integer equal to 0, 1, or 2. In some embodiments $OR^1$, $R^2$, $OR^3$ and $OR^4$ are independently derived from phenol, a monoalkylphenol, a dialkylphenol, or a trialkylphenol.

The bis-aryl phosphate can be derived from a bisphenol. Exemplary bisphenols include 2,2-bis(4-hydroxyphenyl)propane (so-called bisphenol A), 2,2-bis(4-hydroxy-3-methylphenyl)propane, bis(4-hydroxyphenyl)methane, bis(4-hydroxy-3,5-dimethylphenyl)methane, and 1,1-bis(4-hydroxyphenyl)ethane. In some embodiments, the bisphenol comprises bisphenol A.

In some embodiments, the flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

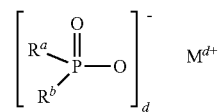

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, n-pentyl, and phenyl. In some embodiments, $R^a$ and $R^b$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles can have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate can be combined with a polymer, such as the poly(phenylene ether), the homopolystyrene, or combination thereof, to form a masterbatch. The metal dialkylphosphinate masterbatch comprises the metal dialkylphosphinate in a concentration greater than is present in the thermoplastic composition as a whole. Employing a masterbatch for the addition of the metal dialkylphosphinate to the other components of the composition can facilitate addition and improve distribution of the metal dialkylphosphinate.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

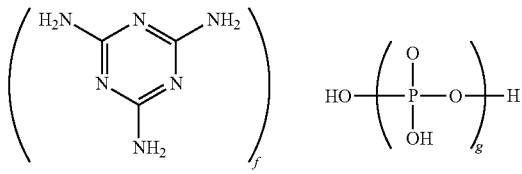

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to about 10,000, specifically about 5 to about 1,000, more specifically about 10 to about 500. Methods for preparing melamine phosphate, melamine pyrophosphate, and melamine polyphosphate are known in the art, and all are commercially available. For example, melamine polyphosphates can be prepared by reacting polyphosphoric acid and melamine, as described, for example, in U.S. Pat. No. 6,025, 419 to Kasowski et al., or by heating melamine pyrophosphate under nitrogen at 290° C. to constant weight, as described in U.S. Pat. No. 5,998,503 to Jacobson et al. In some embodiments, the nitrogen-containing flame retardant comprises melamine cyanurate.

The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations of such metal hydroxides. Exemplary metal hydroxides include magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

When present, the flame retardant is used in an amount of about 2 to about 25 weight percent of the flame retardant, based on the total weight of the composition. Within this range, the flame retardant amount can be about 5 to about 22 weight percent, specifically about 10 to about 20 weight percent.

The composition can, optionally, exclude polymers not described herein as required or optional. For example, in some embodiments the composition comprises less than or equal to 1 weight percent of a polyamide. The polyamide amount can be less than or equal to 0.5 weight percent, specifically less than or equal to 0.1 weight percent. In some embodiments, the composition excludes polyamide. In some embodiments, the composition comprises less than or equal to 1 weight percent of a polyolefin. The polyolefin amount can be less than or equal to 0.5 weight percent, specifically less than or equal to 0.1 weight percent. In some embodiments, the composition excludes polyolefin.

In a very specific embodiment, the composition comprises about 60 to about 80 weight percent of a poly(2,6-dimethyl-1,4-phenylene ether) having an intrinsic viscosity of about 0.35 to about 0.6 deciliter per gram measured at 25° C. in chloroform; about 5 to about 15 weight percent of polymerized styrene residue, about 0.4 to about 2 weight percent of a polymerized 1-butene residue, about 10 to about 20 weight percent of a flame retardant comprising an organophosphate ester, and about 0.2 to about 1.2 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified. In some embodiments, the composition comprises less than or equal to 0.7 weight percent of polymerized polybutadiene residue.

The invention extends to methods of preparing the composition. Thus, one embodiment is a method of forming a composition, comprising: melt blending components comprising greater than 40 to about 94.8 weight percent of a poly(phenylene ether), about 5 to about 59.8 weight percent of a homopolystyrene, and an amount of an acrylonitrile homopolymer and/or copolymer sufficient to provide about 0.2 to less than 1.5 weight percent of polymerized acrylonitrile residue to form a composition; wherein the composition comprises less than or equal to 120 parts per million by weight of secondary aliphatic hydroxyl groups; and wherein all amounts are based on the total weight of the composition, unless a different weight basis is specified. Within the range of greater than 40 weight percent about 94.8 weight percent, the poly(phenylene ether) amount can be greater than 41 weight percent, greater than 43 weight percent, greater than 45 weight percent or greater than 50 weight percent; and up to 90 weight percent, up to 80 weight percent, up to 70 weight percent, up to 65 weight percent, or up to 60 weight percent. Within the range of about 5 to about 59.8 weight percent, the homopolystyrene amount can be about 10 to about 50 weight percent, specifically about 15 to about 40 weight percent, more specifically about 15 to about 30 weight percent. Within the range of about 0.2 to less than 1.5 weight percent the amount of polymerized acrylonitrile residue can be about 0.4 to about 1.4 weight percent, specifically about 0.6 to about 1.3 weight percent, more specifically about 0.6 to about 1.2 weight percent, even more specifically about 0.6 to about 1 weight percent. Within the upper limit of less than or equal to 120 parts per million by weight, the concentration of secondary aliphatic hydroxyl groups can be less than or equal to 100 parts per million by weight, or less than or equal to 50 parts per million by weight. In some embodiments, the composition comprises less than or equal to 0.7 weight percent of polymerized butadiene residue. Within the upper limit of less than or equal to 0.7 weight percent, the amount of polymerized butadiene can be less than or equal to 0.6 weight percent, less than or equal to 0.5 weight percent, less than or equal to 0.3 weight percent or less than or equal to 0.1 weight percent; or the composition can be substantially free of polymerized butadiene residue. In some embodiments, at least a portion of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof. In some embodiments, substantially all of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof. All of the compositional variations described above in the context of the composition apply as well to the method of forming the composition.

The invention further extends to compositions prepared by the method or obtainable by the method.

The composition is useful for forming articles, especially injection molded articles. Specific articles include, for example, electrical junction boxes, electrical sockets, electrical connectors, television deflection yokes, television backs, television bezels, lighting fixtures, residential and commercial electrical wiring devices, electrical meters, and electrical charger housings. In some embodiments, injection molding conditions include a barrel temperature of about 250 to about 350° C., specifically about 270 to about 310° C., and a mold temperature of about 50 to about 100° C., specifically about 55 to about 90° C. Illustrative injection molding conditions are described in the working examples below.

The invention includes at least the following embodiments.

Embodiment 1

A composition comprising: greater than 40 to about 94.8 weight percent of a poly(phenylene ether); about 5 to about 59.8 weight percent of polymerized styrene residue; and about 0.2 to less than 1.5 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified.

Embodiment 2

The composition of embodiment 1, wherein at least a portion of the polymerized styrene residue and at least a portion of the polymerized acrylonitrile residue are provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof.

Embodiment 3

The composition of embodiment 1, wherein substantially all of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof.

Embodiment 4

The composition of embodiment 3, wherein the homopolystyrene comprises an atactic homopolystyrene.

Embodiment 5

The composition of any of embodiments 1-4, wherein the poly(phenylene ether) comprises a virgin poly(phenylene ether).

Embodiment 6

The composition of any of embodiments 1-5, wherein the composition comprises less than or equal to 0.7 weight percent of polymerized butadiene residue.

Embodiment 7

The composition of any of embodiments 1-5, further comprising about 0.5 to about 18 weight percent of a polymerized butadiene residue.

Embodiment 8

The composition of any of embodiments 1-7, further comprising about 0.1 to about 5 weight percent of a polymerized 1-butene residue.

Embodiment 9

The composition of any of embodiments 1-8, further comprising about 2 to about 25 weight percent of a flame retardant.

Embodiment 10

The composition of embodiment 9, wherein the flame retardant comprises an organophosphate ester.

Embodiment 11

The composition of any of embodiments 1-10, comprising less than or equal to 1 weight percent of a polyamide.

Embodiment 12

The composition of any of embodiments 1-11, comprising less than or equal to 1 weight percent of a polyolefin.

Embodiment 13

A composition comprising: about 60 to about 80 weight percent of a poly(2,6-dimethyl-1,4-phenylene ether) having an intrinsic viscosity of about 0.35 to about 0.6 deciliter per gram measured at 25° C. in chloroform; about 5 to about 15 weight percent of polymerized styrene residue; about 0.4 to about 2 weight percent of a polymerized 1-butene residue; about 10 to about 20 weight percent of a flame retardant comprising an organophosphate ester; and about 0.2 to about 1.2 weight percent of polymerized acrylonitrile residue; wherein the composition comprises less than or equal to 120 parts per million by weight of secondary aliphatic hydroxyl groups; and wherein all amounts are based on the total weight of the composition, unless a different weight basis is specified.

Embodiment 14

An article comprising the composition of any of embodiments 1-13.

Embodiment 15

A method of forming a composition, comprising: melt blending components comprising greater than 40 to about 94.8 weight percent of a poly(phenylene ether), about 5 to about 59.8 weight percent of a homopolystyrene, and an amount of an acrylonitrile homopolymer and/or copolymer sufficient to provide about 0.2 to less than 1.5 weight percent of polymerized acrylonitrile residue to form a composition; wherein the composition comprises less than or equal to 120 parts per million by weight of secondary aliphatic hydroxyl groups; and wherein all amounts are based on the total weight of the composition, unless a different weight basis is specified.

Embodiment 16

The method of embodiment 15, wherein at least a portion of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof.

Embodiment 17

The method of embodiment 15, wherein substantially all of the polymerized acrylonitrile residue is provided in the form of a post-consumer recycled material comprising homopolystyrene and an acrylonitrile copolymer selected from the group consisting of styrene-acrylonitrile copolymers, acrylonitrile-butadiene-styrene copolymers, and combinations thereof.

The invention is further illustrated by the following non-limiting examples.

Examples 1-7, Comparative Examples 1-9

These examples illustrate the property effects of adding an acrylonitrile copolymer to compositions comprising poly(phenylene ether) and homopolystyrene. A styrene-acrylonitrile copolymer is used to simulate the effect of styrene-acrylonitrile copolymer impurities in recycled polystyrene.

Compositions were prepared using the components summarized in Table 1. Inventive and comparative examples are summarized in Table 2, where component amounts are expressed in weight percent. In Table 2, the row labeled "% SAN in PS" is calculated as 100×(weight percent SAN)/(weight percent PS+weight percent SAN). "% SAN in PS" is a proxy for the corresponding weight percent of SAN in a recycled homopolystyrene feedstock. Compositions were compounded on a Toshiba TEM50A twin-screw extruder having a 53 millimeter internal diameter and operating at a screw rotation rate of 280 rotations per minute and a throughput of about 80 kilograms per hour. The extruder utilized twelve temperature-controlled zones plus a temperature-controlled die. For Examples 1 and 2 and Comparative Examples 1 and 2, the temperatures from feed throat to die were 300° C./300° C./300° C./300° C./300° C./300° C./300° C./300° C./300° C./300° C./300° C./300° C./320° C. For Examples 3-6 and Comparative Examples 3-6, the temperatures from feed throat to die were 150° C./270° C./280° C./280° C./280° C./280° C./280° C./280° C./280° C./280° C./280° C./280° C./290° C. For Example 7 and Comparative Examples 7-9, the temperatures from feed throat to die were 250° C./270° C./280° C./280° C./280° C./280° C./280° C./280° C./280° C./280° C./280° C./280° C./300° C. All components were added at the feed throat, except for the flame retardants resorcinol bis(diphenyl phosphate) and bisphenol A bis(diphenyl phosphate), which were added via an injection port in zone 2. The extrudate was cooled in a water bath, pelletized, and dried for 2 hours at 90° C. prior to use for molding test articles.

TABLE 1

| Component | Description |
| --- | --- |
| PPE 0.46 | Poly(2,6-dimethyl-1,4-phenylene ether), CAS Reg. No. 25134-01-4, having an intrinsic viscosity of about 0.46 deciliter per gram as measured in chloroform at 25° C.; obtained as a virgin material as PPO 646 from SABIC Innovative Plastics. |
| HIPS | High-impact polystyrene (rubber-modified polystyrene), CAS Reg. No. 9003-55-8, having a polybutadiene content of about 10 weight percent and a melt flow index of about 1.7 grams per 10 minutes when measured at 200° C. with an applied load of 5 kilograms; obtained as a virgin material as HT644 from Mitsubishi Monsanto or as 870ST from Mitsui Toatsu. |
| HF HIPS | High-flow high-impact polystyrene (rubber-modified polystyrene), CAS Reg. No. 9003-55-8, having a polybutadiene content of about 8 weight percent and a melt flow index of about 8 grams per 10 minutes when measured at 200° C. with an applied load of 5 kilograms; obtained as a virgin material as TOPOLEX 876-HF from Mitsui Chemicals Co., Ltd., or as SUPREME SH 2114 HF from Supreme Petrochem, Ltd. |
| PS | Atactic homopolystyrene, CAS Reg. No. 9003-53-6, having a melt flow index of about 9 grams per 10 minutes when measured at 200° C. with an applied load of 5 kilograms; obtained as a virgin material as STYRON 680A from Dow Chemical Pacific, Ltd. |

TABLE 1-continued

| Component | Description |
|---|---|
| SBS | Polystyrene-polybutadiene-polystyrene triblock copolymer, CAS Reg. No. 9003-55-8, having a polystyrene content of 29-33 weight percent and a solution viscosity of about 4 Pascal-seconds measured at 25° C. in a 25 weight percent solution in toluene; obtained as Kraton D1101 from Kraton Performance Polymers Inc. |
| SEBS | Polystyrene-poly(ethylene-butylene)-polystyrene triblock copolymer, CAS Reg. No. 66070-58-4, having a polystyrene content of about 31-35 weight percent and a solution viscosity of about 1.5 Pascal-seconds measured at 25° C. in a 25 weight percent solution in toluene; obtained as Kraton G1651 from Kraton Performance Polymers Inc. |
| RDP | Resorcinol bis(diphenyl phosphate), CAS Reg. No. 57583-54-7; obtained as CR733S from Daihachi Chemical Industry Co., Ltd. |
| BPADP | Bisphenol A bis(diphenyl phosphate), CAS Reg. No. 181028-79-5; obtained as CR741S from Daihachi Chemical Industry Co., Ltd. |
| SAN | Styrene-acrylonitrile copolymer, CAS Reg. No. 9003-54-7, having about 30 weight percent polymerized acrylonitrile residue; obtained as SR30B from Ube Cycon. |

Test articles for physical testing were injection molded on a Toyo Machinery and Metal Co., Ltd. Toyo Plaster Ti-80G2 injection molding machine. Test articles for physical property testing were molded using a barrel temperature of 280° C. and a mold temperature of 60° C. for Examples 1 and 2 and Comparative Examples 1 and 2, and a barrel temperature of 200° C. and a mold temperature of 50° C. for Examples 3-7 and Comparative Examples 3-9.

Haze values were measured according to JIS K7136 using a Murakami color research lab, HM-150 haze meter and 3.2 millimeter thick plates, which were molded from blends of the polystyrene and polyacrylonitrile (without other components) using a barrel temperature of 220° C. and mold temperature 50° C.

Notched Izod impact strength values, expressed in units of kilogram-centimeter/centimeter, were measured according to ASTM D256-10 at a temperature of 23° C. using a hammer energy of 2 joules, a test sample having cross-sectional dimensions of 3.2 by 12.7 millimeters and a length of 6.4 centimeters, a notch angle of 45°, an 10.16 millimeter depth of material under the notch, and 5 specimens per composition.

Retention of notched Izod impact strength, expressed in units of percent, was determined relative to the corresponding sample without added SAN. For instance, for inventive Example 2, the retention of notched Izod impact strength was calculated relative to the value for Comparative Example 1 as 100×21.4/23.5=91%. And for Example 3, the retention of notched Izod impact strength was calculated relative to the value for Comparative Example 3 as 100×17/17=100%.

The results show that the compositions made with a combination of polystyrene and SAN that exhibit acceptable haze values (i.e., values less than or equal to 98%) exhibit acceptable notched Izod impact strength retention (i.e., impact strength retention of at least 85%) when the composition comprises less than 1.5 weight percent polymerized acrylonitrile residue.

TABLE 2

| | C. Ex. 1 | Ex. 1 | Ex. 2 | C. Ex. 2 | C. Ex. 3 | Ex. 3 | Ex. 4 | C. Ex. 4 |
|---|---|---|---|---|---|---|---|---|
| COMPOSITIONS | | | | | | | | |
| PPE 0.46 | 70 | 70 | 70 | 70 | 40 | 40 | 40 | 40 |
| HIPS | 0 | 0 | 0 | 0 | 14 | 14 | 14 | 14 |
| HF HIPS | 0 | 0 | 0 | 0 | 0 | 0 | 0 | 0 |
| PS | 10 | 9 | 7.5 | 5 | 21 | 18. | 15.8 | 10.5 |
| SBS | 0 | 0 | 0 | 0 | 5 | 5 | 5 | 5 |
| SEBS | 5 | 5 | 5 | 5 | 0 | 0 | 0 | 0 |
| RDP | 0 | 0 | 0 | 0 | 20 | 20 | 20 | 20 |
| BPADP | 15 | 15 | 15 | 15 | 0 | 0 | 0 | 0 |
| SAN | 0 | 1 | 2.5 | 5 | 0 | 2.1 | 4.2 | 10.5 |
| total | 100.0 | 100.0 | 100.0 | 100.0 | 100.0 | 100.0 | 100.0 | 100.0 |
| % SAN in PS | 0.00 | 10.00 | 25.00 | 50.00 | 0.00 | 9.95 | 19.05 | 50.00 |
| % AN in total composition | 0.00 | 0.30 | 0.75 | 1.50 | 0.00 | 0.63 | 1.20 | 3.27 |
| PROPERTIES | | | | | | | | |
| haze of PS + SAN | 0.7 | 97 | 98 | 99 | 0.7 | 97 | 98 | 99 |
| notched Izod (kg-cm/cm) | 24 | 24 | 21 | 18 | 17 | 17 | 16 | 6 |
| retention of notched Izod (%) | 100 | 100 | 91 | 76 | 100 | 100 | 99 | 35 |
| | C. Ex. 5 | Ex. 5 | Ex. 6 | C. Ex. 6 | C. Ex. 7 | Ex. 7 | C. Ex. 8 | C. Ex. 9 |
| COMPOSITIONS | | | | | | | | |
| PPE 0.46 | 35 | 35 | 35 | 35 | 38 | 38 | 38 | 38 |
| HIPS | 0 | 0 | 0 | 0 | 0 | 0 | 0 | 0 |
| HF HIPS | 30 | 30 | 30 | 30 | 0 | 0 | 0 | 0 |
| PS | 16 | 14.4 | 12 | 8 | 40 | 36 | 30 | 20 |
| SBS | 2 | 2 | 2 | 2 | 6 | 6 | 6 | 6 |
| SEBS | 0 | 0 | 0 | 0 | 0 | 0 | 0 | 0 |

TABLE 2-continued

|  | | | | | | | | |
|---|---|---|---|---|---|---|---|---|
| RDP | 17 | 17 | 17 | 17 | 0 | 0 | 0 | 0 |
| BPADP | 0 | 0 | 0 | 0 | 16 | 16 | 16 | 16 |
| SAN | 0 | 1.6 | 4 | 8 | 0 | 4 | 10 | 20 |
| total | 100.0 | 100.0 | 100.0 | 100.0 | 100.0 | 100.0 | 100.0 | 100.0 |
| % SAN in PS | 0.00 | 10.26 | 13.04 | 50.00 | 0.00 | 10.00 | 25.00 | 50.00 |
| % AN in total composition | 0.00 | 0.48 | 0.63 | 2.40 | 0.00 | 1.20 | 3.00 | 6.00 |
| PROPERTIES | | | | | | | | |
| haze of PS + SAN | 0.7 | 97 | 98 | 99 | 0.7 | 97 | 98 | 99 |
| notched Izod (kg-cm/cm) | 17 | 17 | 16 | 3 | 2.8 | 2.5 | 1.2 | 1.0 |
| retention of notched Izod (%) | 100 | 100 | 99 | 13 | 100 | 89 | 42 | 36 |

The invention claimed is:

1. A composition comprising:
    greater than 40 to about 94.8 weight percent of a poly(phenylene ether) consisting of poly(2,6-dimethyl-1,4-phenylene ether);
    about 11 to 20 weight percent of polymerized styrene residue; and
    about 0.2 to less than 1.5 weight percent of polymerized acrylonitrile residue;
wherein the polymerized acrylonitrile residue is present in the form of styrene-acrylonitrile copolymer;
    wherein the composition comprises less than or equal to 120 parts per million by weight of secondary aliphatic hydroxyl groups; and
    wherein all amounts are based on the total weight of the composition, unless a different weight basis is specified.

2. The composition of claim 1, wherein at least a portion of the polymerized styrene residue is provided in the form of a post-consumer recycled material comprising homopolystyrene and styrene-acrylonitrile copolymer.

3. The composition of claim 2, wherein the homopolystyrene comprises an atactic homopolystyrene.

4. The composition of claim 1, wherein the poly(phenylene ether) comprises a virgin poly(phenylene ether).

5. The composition of claim 1, wherein the composition comprises less than or equal to 0.7 weight percent of polymerized butadiene residue.

6. The composition of claim 1, further comprising about 0.5 to about 18 weight percent of a polymerized butadiene residue.

7. The composition of claim 1, further comprising about 0.1 to about 5 weight percent of a polymerized 1-butene residue.

8. The composition of claim 1, further comprising about 2 to about 25 weight percent of a flame retardant.

9. The composition of claim 8, wherein the flame retardant comprises an organophosphate ester.

10. The composition of claim 1, comprising less than or equal to 1 weight percent of a polyamide.

11. The composition of claim 1, comprising less than or equal to 1 weight percent of a polyolefin.

12. A composition comprising:
    about 60 to about 80 weight percent of a poly(phenylene ether) consisting of a poly(2,6-dimethyl-1,4-phenylene ether) having an intrinsic viscosity of about 0.35 to about 0.6 deciliter per gram measured at 25° C. in chloroform;
    about 5 to about 15 weight percent of polymerized styrene residue;
    about 0.4 to about 2 weight percent of a polymerized 1-butene residue;
    about 10 to about 20 weight percent of a flame retardant comprising an organophosphate ester; and
    about 0.2 to about 1.2 weight percent of polymerized acrylonitrile residue;
wherein the polymerized acrylonitrile residue is present in the form of styrene-acrylonitrile copolymer;
    wherein the composition comprises less than or equal to 120 parts per million by weight of secondary aliphatic hydroxyl groups; and
    wherein all amounts are based on the total weight of the composition, unless a different weight basis is specified.

13. An article comprising the composition of claim 1.

* * * * *